(12) United States Patent
Yoshino

(10) Patent No.: US 7,047,595 B2
(45) Date of Patent: May 23, 2006

(54) SELF-RUNNING CLEANING APPARATUS (75) Inventor: Junji Yoshino, Tokyo (JP)

(73) Assignee: Amenity-Technos. Co. Ltd. (JP)

( * ) Notice: Subject to any disclaimer, the term of this patent is extended or adjusted under 35 U.S.C. 154(b) by 418 days.

(21) Appl. No.: 10/310,364

(22) Filed: Dec. 5, 2002

(65) Prior Publication Data
US 2003/0102014 A1  Jun. 5, 2003

(30) Foreign Application Priority Data
Dec. 5, 2001 (JP) .............................. 2001-371600
Dec. 5, 2001 (JP) .............................. 2001-371601

(51) Int. Cl.
*A47L 9/02* (2006.01)

(52) U.S. Cl. .................. 15/359; 15/319; 15/340.1; 15/415.1

(58) Field of Classification Search .................. 15/319, 15/340.1, 354, 359, 360, 415.1
See application file for complete search history.

(56) References Cited

U.S. PATENT DOCUMENTS 1,318,881 A * 10/1919 Kelley ........................ 15/354
2,823,412 A * 2/1958 Kirby ......................... 15/354
3,939,528 A * 2/1976 Mossinsohn ................. 15/354
4,306,329 A * 12/1981 Yokoi ......................... 15/319
5,720,077 A * 2/1998 Nakamura et al. .......... 15/340.1
6,532,622 B1 * 3/2003 Seon et al. .................. 15/415.1

FOREIGN PATENT DOCUMENTS

| JP | 62-206450 | 9/1987 |
| JP | 08-004337 | 1/1996 |
| JP | 11-190140 | 7/1999 |
| JP | 2001-011842 | 1/2001 |

* cited by examiner

Primary Examiner—Theresa T. Snider
(74) Attorney, Agent, or Firm—Pendorf & Cutliff (57) ABSTRACT This invention provides a self-running cleaning apparatus and self-cleaning method that is capable of efficiently moving over the entire bottom surface of a pool and cleaning the entire bottom surface of the pool in a short period of time. A movement-control unit 50 operates a right motor 51, left motor 53 and displacement motor 55 based on a movement-operation program that is stored in the operation memory 57, and moves the self-running cleaning apparatus according to information received from distance sensors 16 to 21 that are located on the front, right side and left side. The operation memory 57 stores the wall-movement operation, detour-movement operation, 90-degree right turn operation, 180-degree right turn operation, 180-degree left turn operation and position-detection operation as the movement-operation program.

4 Claims, 10 Drawing Sheets

SELF-RUNNING CLEANING APPARATUS

BACKGROUND OF THE INVENTION

1. Field of the Invention

This invention relates to a self-running cleaning apparatus, which automatically moves over and cleans a floor, and the self-running cleaning method thereof, and more particularly to a self-running cleaning apparatus, which automatically moves over and cleans a floor in a cleaning area that is surrounded by walls such as a pool, and the self-running cleaning method thereof.

2. Description of the Related Art

Self-running cleaning apparatuses for cleaning a pool filled with water that automatically moves over the bottom surface of the pool and cleans any objects or garbage that build up on the bottom surface have been proposed. The prior self-running cleaning apparatuses comprise a mechanism for evading the wall surface of the pool when it comes close to the pool wall, and they clean the pool by randomly moving over the bottom surface of the pool.

However, in the prior technology, since the apparatus moves randomly over the bottom surface of the pool, there were problems in that the apparatus had to be operated for a long period of time to be able to clean the entire bottom surface of the pool, and there were places that were cleaned many times over and over again, as well as places that were not cleaned at all.

SUMMARY OF THE INVENTION

In consideration of the problems described above, the object of this invention is to provide a self-running cleaning apparatus and self-running cleaning method that is capable of moving efficiently over the entire bottom surface of a pool and cleaning the entire bottom surface of the pool within a short period of time without wasting time and energy.

This invention is constructed as described below in order to solve the problems mentioned above.

The present invention is a self-running cleaning apparatus that moves over and cleans an area enclosed by wall surfaces and comprising: a side-distance-detection means of detecting the distance from the sides of the self-running cleaning apparatus to the wall surfaces; and a wall-movement-control means that moves the self-running cleaning apparatus along the wall surface while maintaining the side distance detected by the side-distance-detection means.

The present invention further comprises a front-distance-detection means of detecting the distance from the front of the self-running cleaning apparatus to the wall surface in the front; and a 90-degree-turn-control means of turning the direction of movement of the self-running cleaning apparatus 90 degrees when the front-distance-detection means detects that the distance is a first pre-determined front distance.

The present invention also contemplates that in the self-running cleaning apparatus, after the 90-degree-turn-control means turns the self-running cleaning apparatus 90 degrees, the wall-movement-control means moves the self-running cleaning apparatus along the wall surface while maintaining the same side distance that was maintained when moving along the wall surface before the 90-degree turn.

The present invention further comprises a 180-degree-turn-control means of turning the direction of movement of the self-running cleaning apparatus 180 degrees when the wall-movement-control means moves the self-running cleaning apparatus along the wall surface and the front-distance-detection means detects that the distance to the wall surface in the front is a second pre-determined front distance.

The present invention further contemplates that in the self-running cleaning apparatus, after the 180-degree-turn-control means turns the self-running cleaning apparatus 180 degrees, the wall-movement-control means moves the self-cleaning apparatus along the wall surface while maintaining a different side distance than the side distance that was maintained when moving along the wall surface before the 180-degree turn.

Further, the present invention comprises an obstacle-detection means of detecting obstacles in the front of the self-running cleaning apparatus; and a detour-control means of moving along a pre-determined detour route when the obstacle-detection means detects an obstacle.

The present invention also contemplates a self-running cleaning method of moving a self-running cleaning apparatus over a cleaning area enclosed by walls and cleaning the cleaning area, and whereby the self-running cleaning apparatus detects the side distances from the sides to the wall surfaces, and cleans moving along the wall surface while keeping the detected side distance constant.

Further, in the self-running cleaning method, the self-running apparatus detects the distance from the front to the wall surface in front, and turns the direction of movement 90 degrees when it detects, while moving along the wall surface, that the distance from the front to the wall surface in the front is a first pre-determined front distance.

The invention also contemplates a self-running cleaning method in which, after the self-running cleaning apparatus turns 90 degrees, it moves along the wall surface while maintaining the same side distance that was maintained when moving along the wall surface before the 90-degree turn.

The self-running cleaning apparatus turns the direction of movement 180 degrees when it detects that the distance from the front to the wall surface in the front is a second pre-determined front distance.

After the self-running cleaning apparatus turns 180 degrees, it moves along the wall surface while maintaining a side distance that is different than the side distance that was maintained while moving along the wall surface before the 180-degree turn.

When the self-running cleaning apparatus detects obstacles in the front by an obstacle-detection arm, and moves along a pre-determined detour route when it detects an obstacle.

Further, the present invention contemplates a self-running cleaning apparatus that cleans while moving along a wall surface and comprising: wheels for moving; a suction inlet that has a straight front side and where at least the free end is located further toward the wall side than the wheels; a suction-inlet-installation means of installing the suction inlet such that it can rotate; and a tension means of applying tension to the rotation of the suction inlet such that the front side of the suction inlet is parallel with the axis of the wheels when no external force is applied.

When no external force is applied, the suction inlet is positioned at the very front.

The present invention further comprises a rotation-control means of rotating the direction of movement of the self-running cleaning apparatus 90 degrees when the distance from the front to the wall surface in the front becomes a specified pre-determined distance; and wherein the suction inlet is pressed and rotated by the wall surface in the front during the turning operation by the rotation-control means.

When the shortest distance between the center of rotation during the turning operation by the rotation-control means and the wall surface is taken to be R, the range of rotation of the suction inlet can be located within an arc having radius R around whose center the free end of the suction inlet rotates.

Further, the present invention discloses a self-running cleaning apparatus wherein a rotatable guide roller is attached to the free end of the suction inlet.

The present invention also contemplates a self-running cleaning apparatus wherein the suction inlet comprises a suspended rotating shaft, and the suction-inlet-installation means comprises a bearing that supports the rotating shaft from the outside such that it can rotate, and wherein suction is performed through the rotating shaft.

The present invention further contemplates a self-running cleaning apparatus comprising: wheels for moving; a suction inlet that has a straight front side and where at least the free end is located further toward the wall side than the wheels; a suction-inlet-installation means of installing the suction inlet such that it can rotate; and a tension means of applying tension to the rotation of the suction inlet such that the front side of the suction inlet is parallel with the axis of the wheels when no external force is applied.

When no external force is applied, the suction inlet is positioned at the very front.

The present invention further comprises a rotation-control means of rotating the direction of movement of the self-running cleaning apparatus 90 degrees when the distance from the front to the wall surface in the front becomes a specified pre-determined distance; and wherein the suction inlet is pressed and rotated by the wall surface in the front during the turning operation by the rotation-control means.

When the shortest distance between the center of rotation during the turning operation by the rotation-control means and the wall surface is taken to be R, the range of rotation of the suction inlet can be located within an arc having radius R around whose center the free end of the suction inlet rotates.

A rotatable guide roller is attached to the free end of the suction inlet.

The suction inlet comprises a suspended rotating shaft, and the suction-inlet-installation means comprises a bearing that supports the rotating shaft from the outside such that it can rotate, and wherein suction is performed through the rotating shaft.

BRIEF DESCRIPTION OF THE DRAWINGS

FIG. 8($a$) and FIG. 8($b$) are drawings for explaining the movement route in the pool for an embodiment of the self-running cleaning apparatus of this invention.

FIG. 9($a$) and FIG. 9($b$) are drawings for explaining the detour movement of an embodiment of the self-running cleaning apparatus of this invention.

FIG. 10($a$) to FIG. 10($e$) are drawings for explaining the movement operation of an embodiment of the self-running cleaning apparatus of this invention.

DESCRIPTION OF THE PREFERRED EMBODIMENT

The preferred embodiment of the invention will be explained in detail below based on the drawings.

Figure 1:
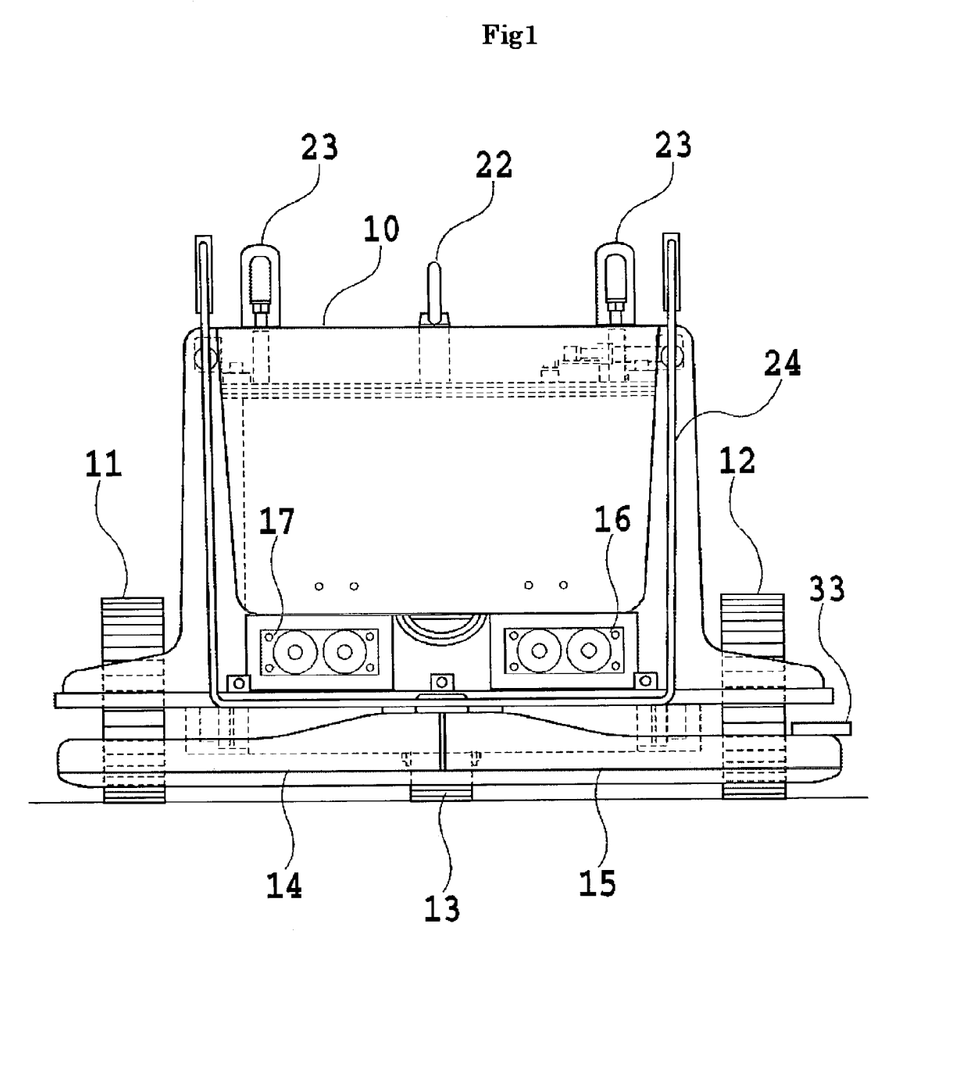
FIG. 1 is a front view of an embodiment of the self-running cleaning apparatus of this invention.
Figure 2:
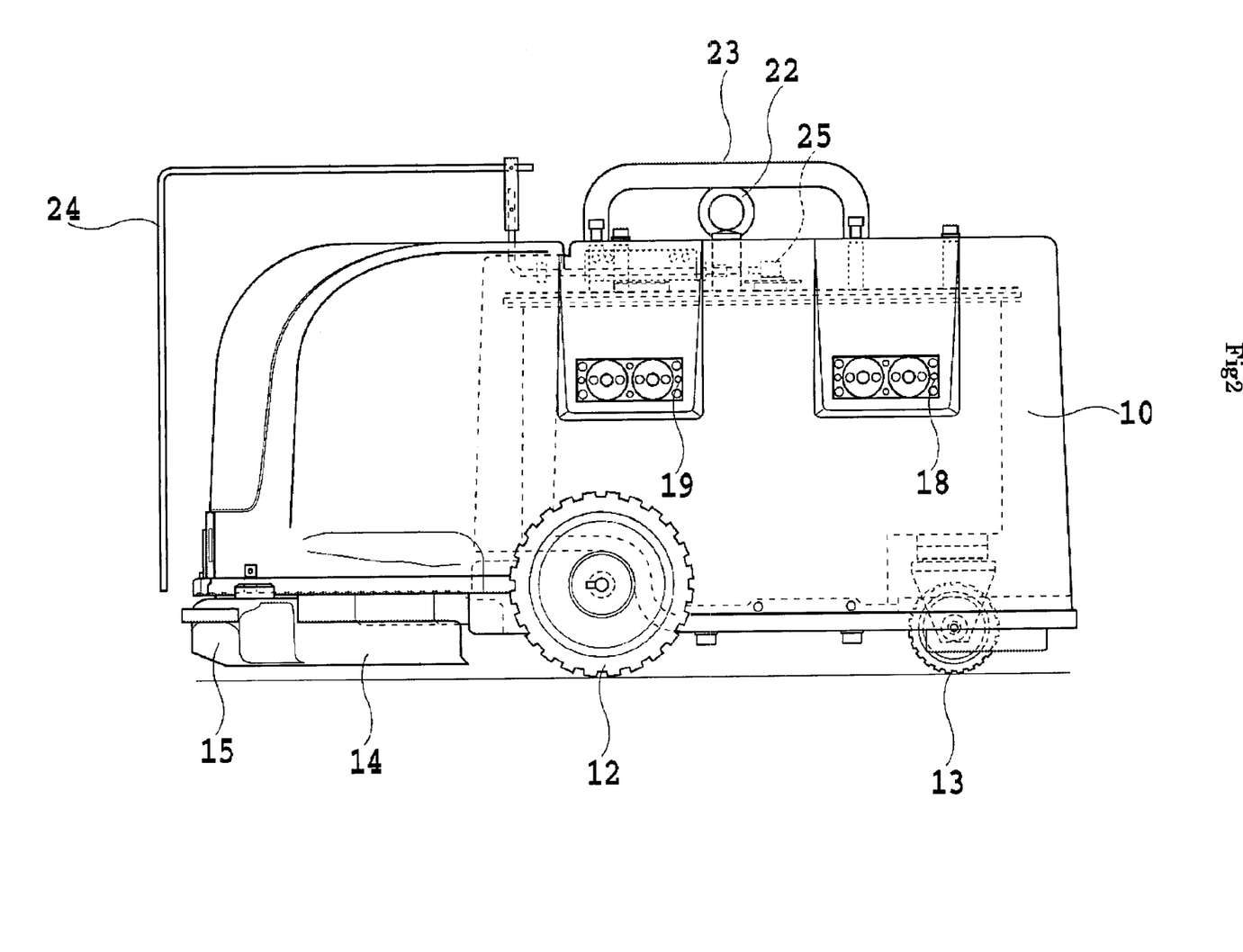
FIG. 2 is a left-side view of an embodiment of the self-running cleaning apparatus of this invention.
Figure 3:
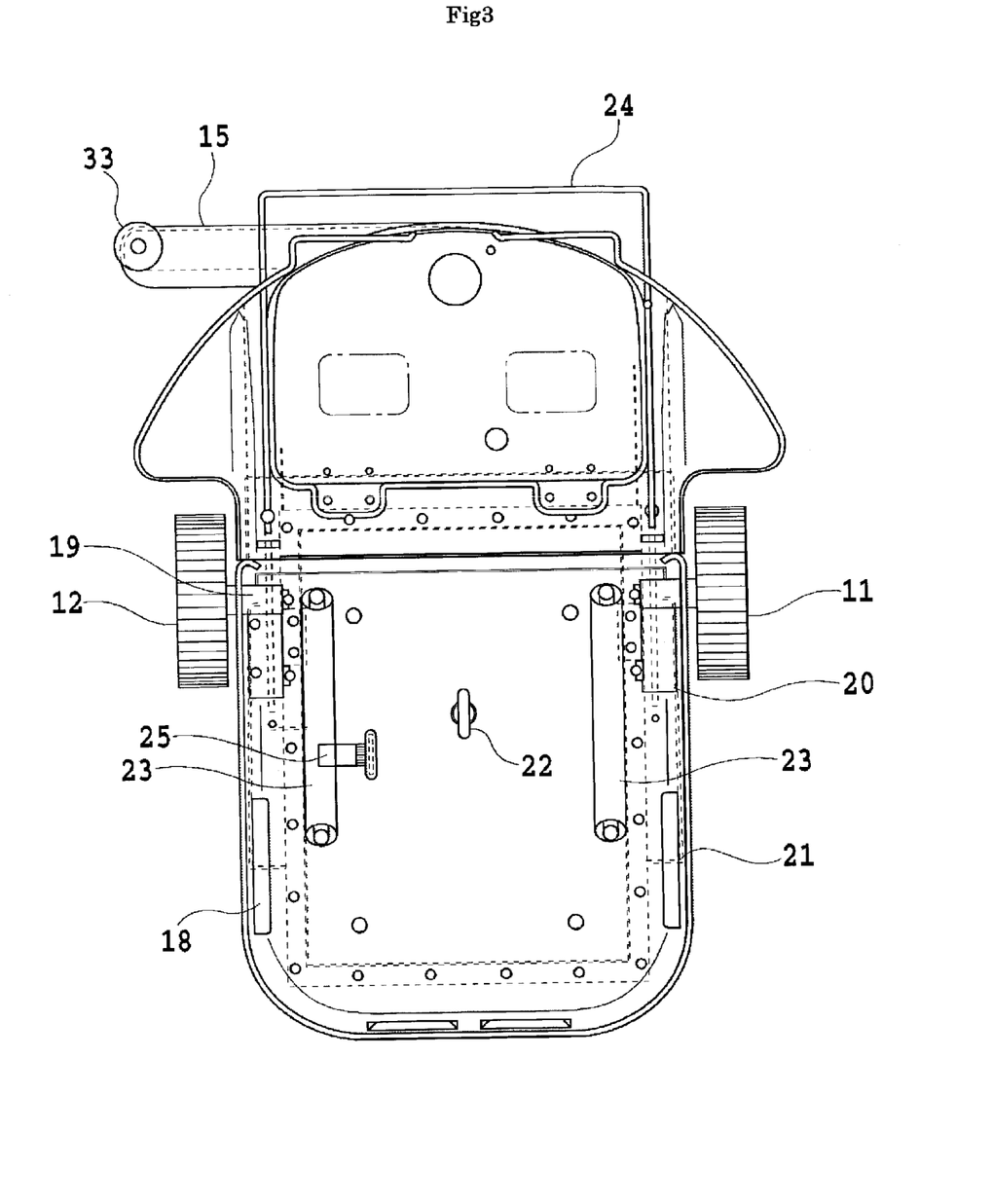
FIG. 3 is a top view of an embodiment of the self-running cleaning apparatus of this invention.

With reference to FIG. 1 to FIG. 3, this embodiment comprises: a main unit 10, a right wheel 11 that is fastened to the main unit 10; a left wheel 12 and direction wheel 13, a fixed inlet 14 and rotating inlet 15 that are located on the bottom surface in the front of the main unit 10; a first front distance sensor 16 and second front distance sensor 17 that are located on the front of the main unit 10; a first left-side distance sensor 18 and second left-side distance sensor 19 that are located on the left side of the main unit 10; a first right-side distance sensor 20 and second right-side distance sensor 21 that are located on the right side of the main unit 10; an I bolt 22 and handle 23 that are located on the top surface of the main unit 10; an obstacle-detection arm 24 that is located on the front side of the main unit 10 such that it can be extended; and a obstacle-detection sensor 25 that detects when the obstacle-detection arm 24 comes in contact with an obstacle. The cleaning apparatus moves automatically by way of the right wheel 11, left wheel 12 and direction wheel 13, and sucks in matter such as dirt through the fixed inlet 14 and rotating inlet 15 by using a suction mechanism (not shown in the figure) that is located inside the main unit 10.

Figure 4:
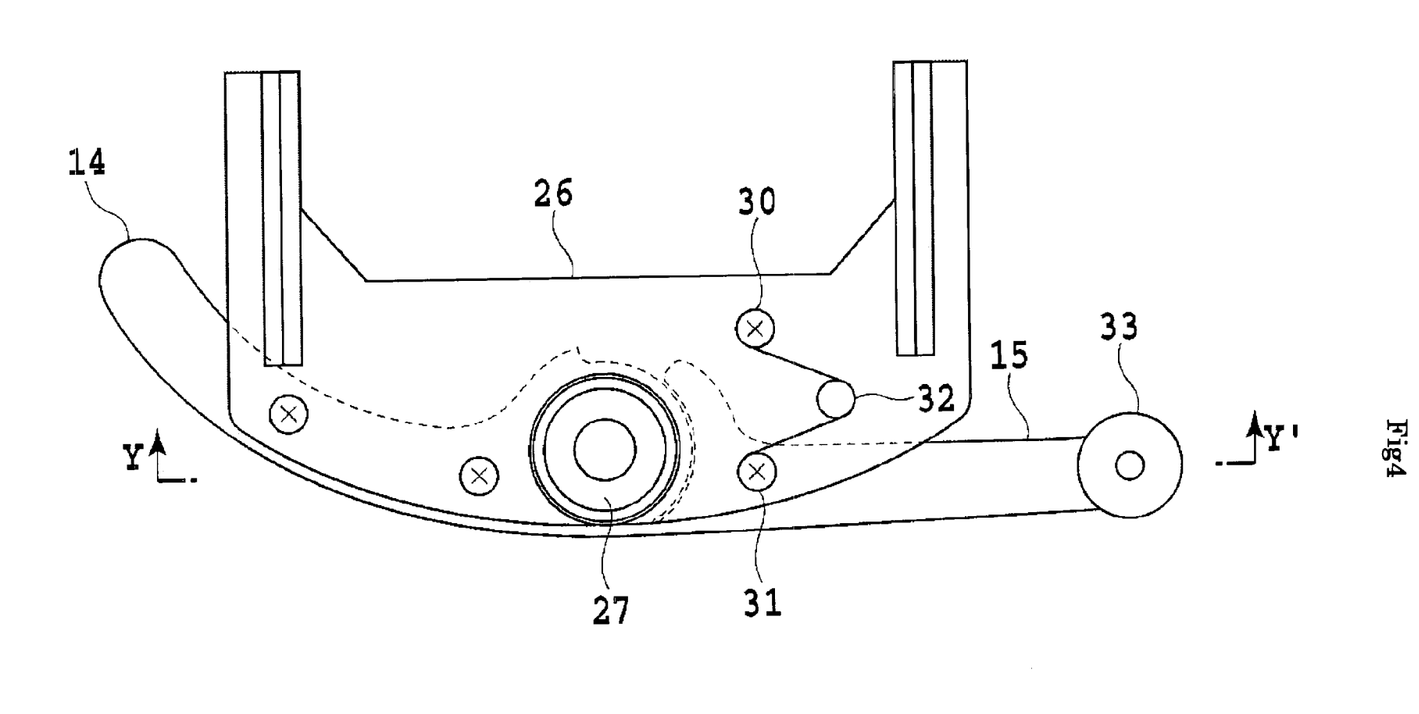
FIG. 4 is a top view showing the construction of the fixed inlet and rotating inlet shown in FIG. 1 to FIG. 3.
Figure 5:
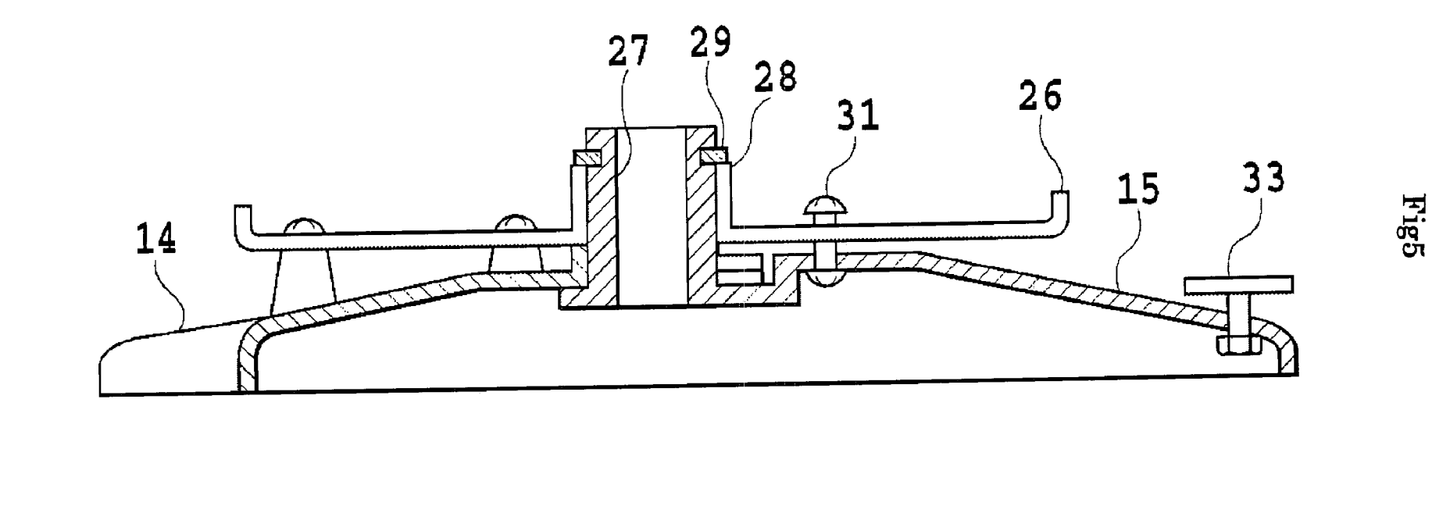
FIG. 5 is a cross-sectional drawing of the section Y—Y' shown in FIG. 4.

As shown in FIG. 4 and FIG. 5, the fixed inlet 14 and rotating inlet 15 are attached to an installation chassis 26 that is installed on the lower part of the front side of the main unit 10, and the rotating inlet 15 is constructed such that it can rotate forward and backward around a suspended rotating shaft 27 that is located on the rotating inlet. The rotating shaft 27 of the rotating inlet 15 is inserted through a bearing 28 that is located on the installation chassis 26, and attached by a C-ring such that it can rotate.

Slits are formed on the side surfaces between the fixed inlet 14 and rotating inlet 15, and by sucking in matter from the suspended section of the rotating shaft 27 by the suction mechanism, the fixed inlet 14 and rotating inlet 15 function as one inlet to suck in matter from the surface of the bottom of the pool.

There is a fixed stud 30 on the installation chassis 26 and there is a rotating-side stud 31 on the rotating inlet 15. In addition, there is a torsion spring 32 attached to the fixed stud 30 and rotating-side stud 31 such that the rotating inlet 15 is pressed on the front side by the torsion spring 32, and when there is no external force applied to the rotating inlet 15, the front side of the rotating inlet is pressed by the torsion spring 32 such that the front side of the rotating inlet 15 is located at the very front of the self-running cleaning apparatus as shown in FIG. 3.

There is a rotatable guide roller 33 attached to the left end (free end) of the rotating inlet 15 such that it can touch the wall surface, and when the guide roller 33 is pressed by the wall surface, the rotating inlet 15 rotates backward around the rotating shaft 27. The left end of the rotating inlet 15 is located further outside of the main unit 10 than the left wheel 12.

The self-running cleaning apparatus of this invention can turn by stopping either the right wheel 11 or left wheel 12 and driving the other wheel, however, by taking the shortest distance from the center point 34 of the wheel axis between the right wheel 11 and left wheel 12 (center point when turning) to the wall surface of the pool (distance nearest the wall surface of the pool in the supposed turning operation) as R, the front side of the fixed inlet 14 is located on the inside of an arc with radius R that is centered around the center point 34.

When the front side of the rotating inlet forms a straight line and is located at the very front position (when it is not rotated), the front side of the rotating inlet 15 becomes parallel with the axis between the left wheel 12 and right wheel 11. Also, the range of rotation of the rotating inlet 15 is set such that by rotating the rotating shaft 27 around its axis, the entire rotating inlet 15 including the guide roller 33 can be positioned on the inside of an arc with radius R centered around the center point 34.

The distance sensors 16 to 21 are distance-detection sensors for measuring the distance from the wall surface, and in this embodiment, ultrasonic sensors are used that emit sound (ultrasonic waves), which cannot be heard by the human ear, and measure the distance to an object by the time it takes for the sound wave reflected by the object to be received.

The obstacle-detection arm 24 and obstacle-detection sensor 25 are for detecting ladders located on the wall surface of the pool as obstacles. The switch of the obstacle-detection sensor 25 is turned ON when the front of the obstacle-detection arm 24 is pressed by an obstacle, and the obstacle-detection sensor 25 detects that it has hit an obstacle in the front.

Figure 6:
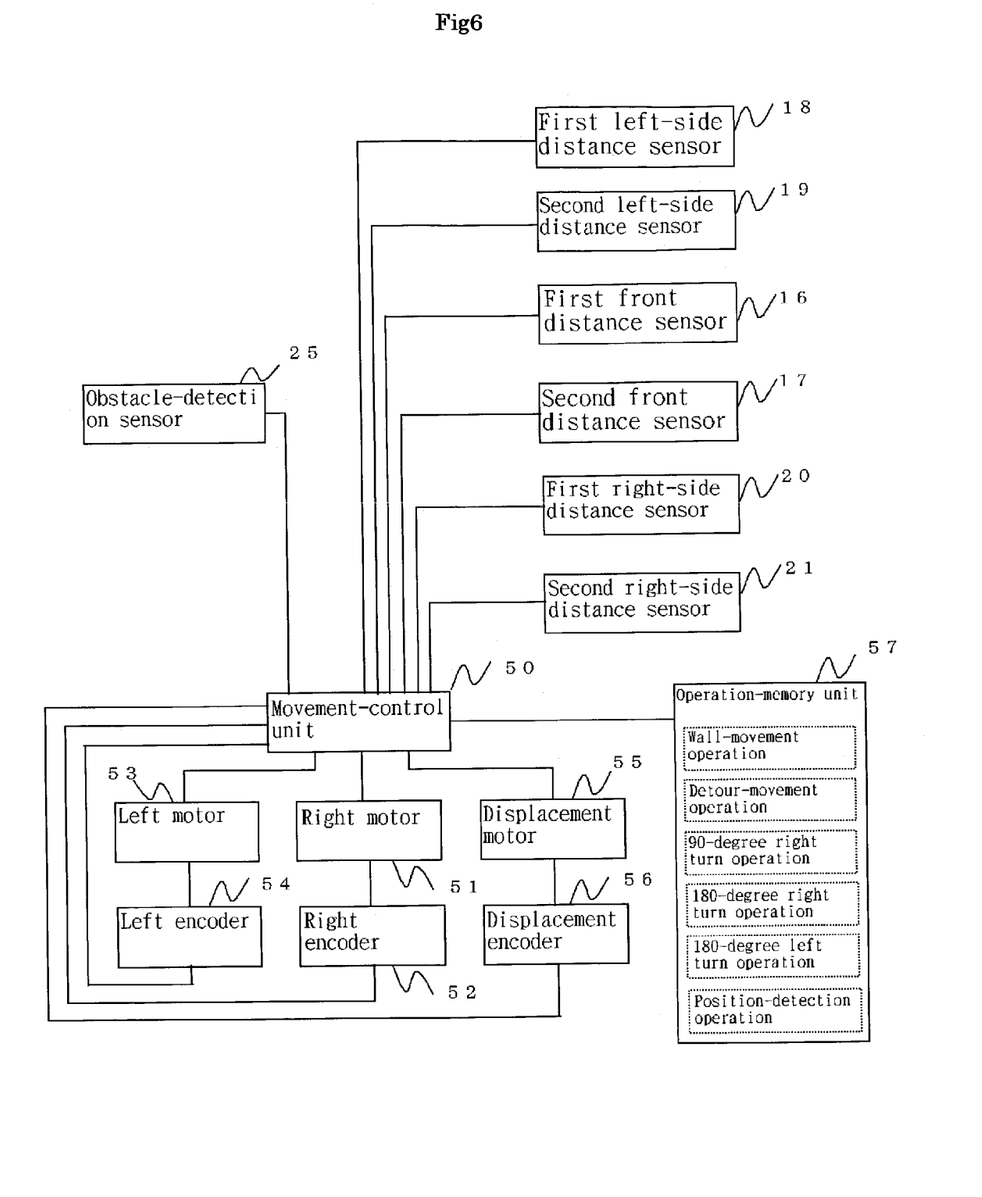
FIG. 6 is a block diagram showing the construction of the drive means of an embodiment of the self-running cleaning apparatus of this invention.

There is a drive means located inside the main unit 10 that drives the left wheel 12, right wheel 11 and direction wheel 13 based on information from the distance sensors 16 to 21. As shown in FIG. 6, this drive means comprises: a movement-control unit 50, a right motor 51 that drives and turns the right wheel 11, a right encoder 52 for obtaining the rpm of the right motor 51, a left motor 53 that drives and turns the left wheel 12, a left encoder 54 for obtaining the rpm of the left motor 53, a displacement motor 55 for shifting the direction of the direction wheel 13, a displacement encoder 56 for obtaining the amount of displacement of the displacement motor 55, and an operation-memory unit 57 that stores a movement operation program that corresponds to the information from the distance sensors 16 to 21.

The movement-control unit 50 performs the movement operation corresponding to the information from the distance sensors 16 to 21 by turning the right motor 51, left motor 53 and displacement motor 55 based on the movement-operation program that is stored in the operation-memory unit 57.

The operation-memory unit 57 stores the wall-surface movement operation, detour movement operation, 90-degree right turn operation, 180-degree right turn operation, 180-degree left turn operation, and position detection operation as the movement-operation program.

Next, the movement operation of this embodiment will be explained in detail with reference to FIG. 7 to FIG. 10.

First, the self-running cleaning apparatus of this embodiment is set up such that its left side is against the wall surface of the pool at point A shown in FIG. 8(a), and cleaning starts. It is preferred that the instructions, such as for starting cleaning, be controllable using a remote control (not shown in the figures) from the pool side.

Figure 7:
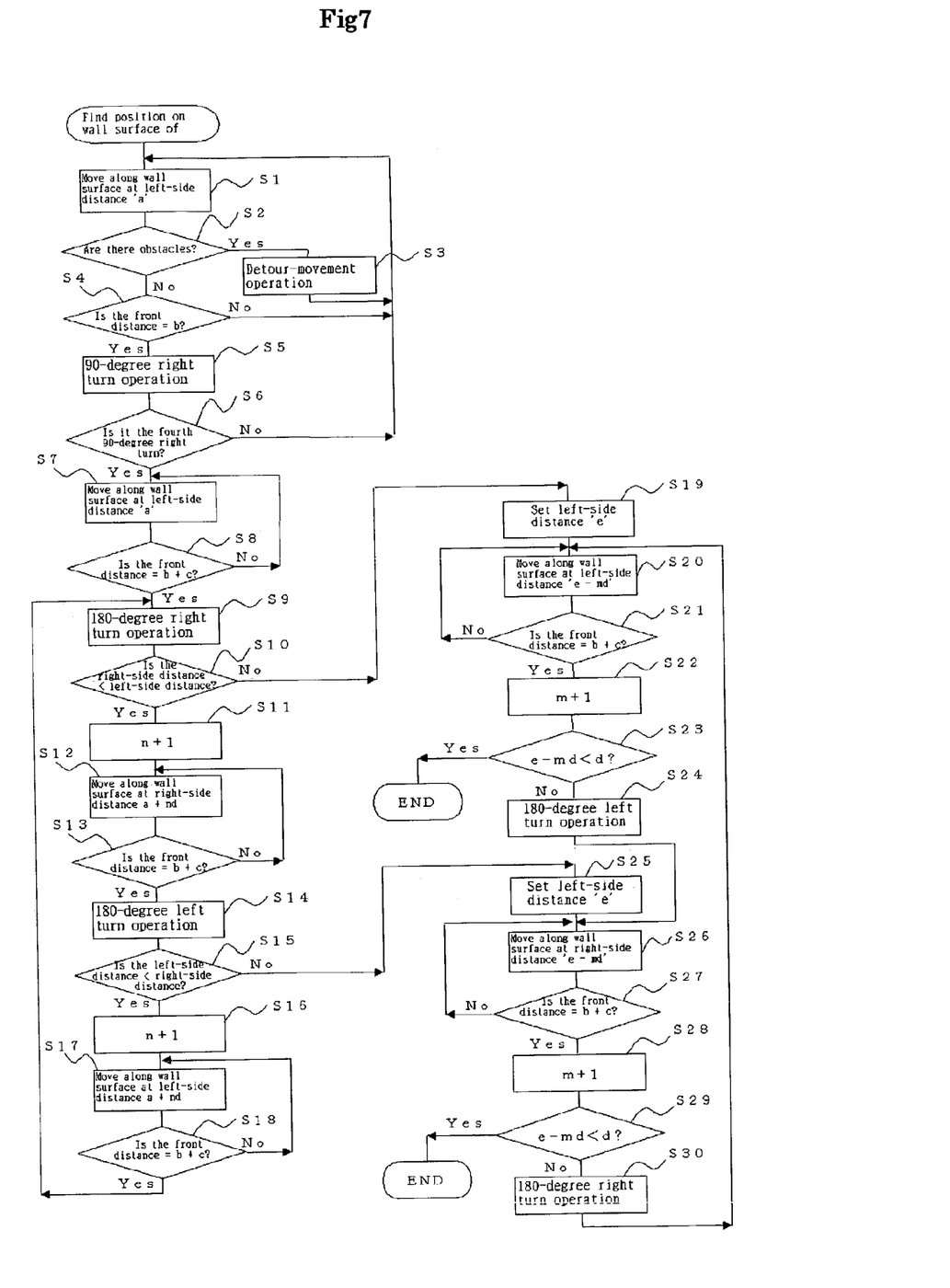
FIG. 7 is a flowchart for explaining the movement operation of an embodiment of the self-running cleaning apparatus of this invention.

When the self-running cleaning apparatus receives an instruction to start cleaning, it moves along the wall surface while maintaining the left-side distance 'a', which is the distance from the wall surface of the pool on the left side (step 1). This operation for moving along the wall surface is an operation of moving while maintaining a fixed distance from the wall surface of the pool on the left side or right side that is detected by the first left-side distance sensor 18, second left-side distance sensor 19, first right-side distance sensor 20 and second right-side distance sensor 21.

The movement-control unit 50 monitors the detected distance from the wall surface of the pool, and when the cleaning apparatus is too far from the wall surface of the pool, it drives the right motor 51, left motor 53 or displacement motor 55 in order to move closer to the wall surface of the pool, and when the cleaning apparatus is too close to the wall surface of the pool, it drives the right motor 51, left motor 53 or displacement motor 55 in order to move away from the wall surface of the pool.

As shown in FIG. 10(a), when performing the operation of moving along the wall surface and maintaining the distance 'a' on the left side, the movement control unit 50 increases the rpm of the right motor 51 such that it is faster than the rpm of the left motor 53 and drives the right wheel 11 faster than the left wheel 12 when the cleaning apparatus moves further from the wall surface of the pool on the left side than the distance 'a', and shifts the displacement motor 55 to the right to turn the direction wheel 13 to the right. When the cleaning apparatus moves closer to the wall surface of the pool than the left-side distance 'a', the movement-control unit 50 increases the rpm of the left motor 53 such that it is faster than the rpm of the right motor 51 and drives the left wheel 12 faster than the right wheel 11, and it shifts the displacement motor 55 to the left to turn the direction wheel 13 to the left. The movement-control unit 50 monitors the rpm of the right motor 51, the rpm of the left motor 53 and the amount of displacement of the displacement motor 55 by the right encoder 52, left encoder 54 and displacement encoder 56.

Also, as shown in FIG. 10(a), the left-side distance 'a' is set such that it is the distance where the guide roller 33 of the rotating inlet 15 comes in contact with the wall surface of the pool, or at a distance a little less than that distance (distance where the rotating inlet is turned a little).

Figure 9:
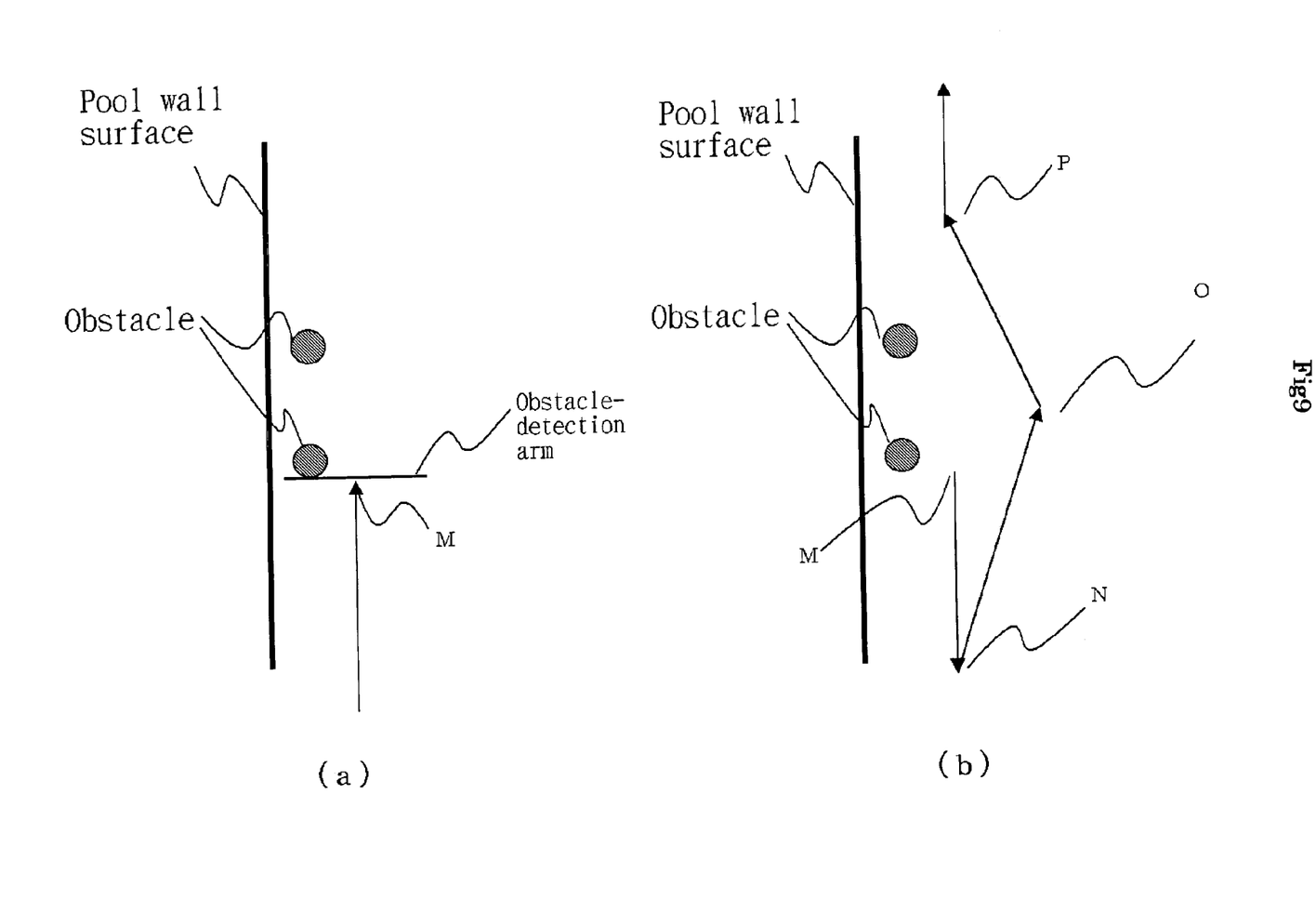

While the self-running cleaning apparatus moves along the wall surface, maintaining a left-distance 'a' from the wall, it uses the obstacle-detection arm 24 and obstacle-detection sensor 25 to detect whether or not there are any obstacles in the front (Step 2), and when it detects that there is an obstacle in the front, it performs the detour operation shown in FIG. 9 (Step 3). When an obstacle is detected at point M shown in FIG. 9(a), the movement-control unit 50 turns the right motor 51 and left motor 53 in the opposite direction, and after the cleaning apparatus has backed up to point N shown in FIG. 9(b), it drives the right motor 51, left motor 53 and displacement motor 55 such that the cleaning apparatus moves away from the wall surface of the pool on the left side until it passes point O where it has evaded the obstacle, then after the cleaning apparatus passes point O, the movement-control unit 50 drives the right motor 51, left motor 53 and displacement motor 55 such that the cleaning apparatus moves to point P where it can again move along the wall surface at left distance 'a', and returns to the operation of Step 1 of moving along the wall at the left distance 'a'. This series of detour movement operations (point N, point O, point P) are preset according to the anticipated obstacles.

Figure 10:
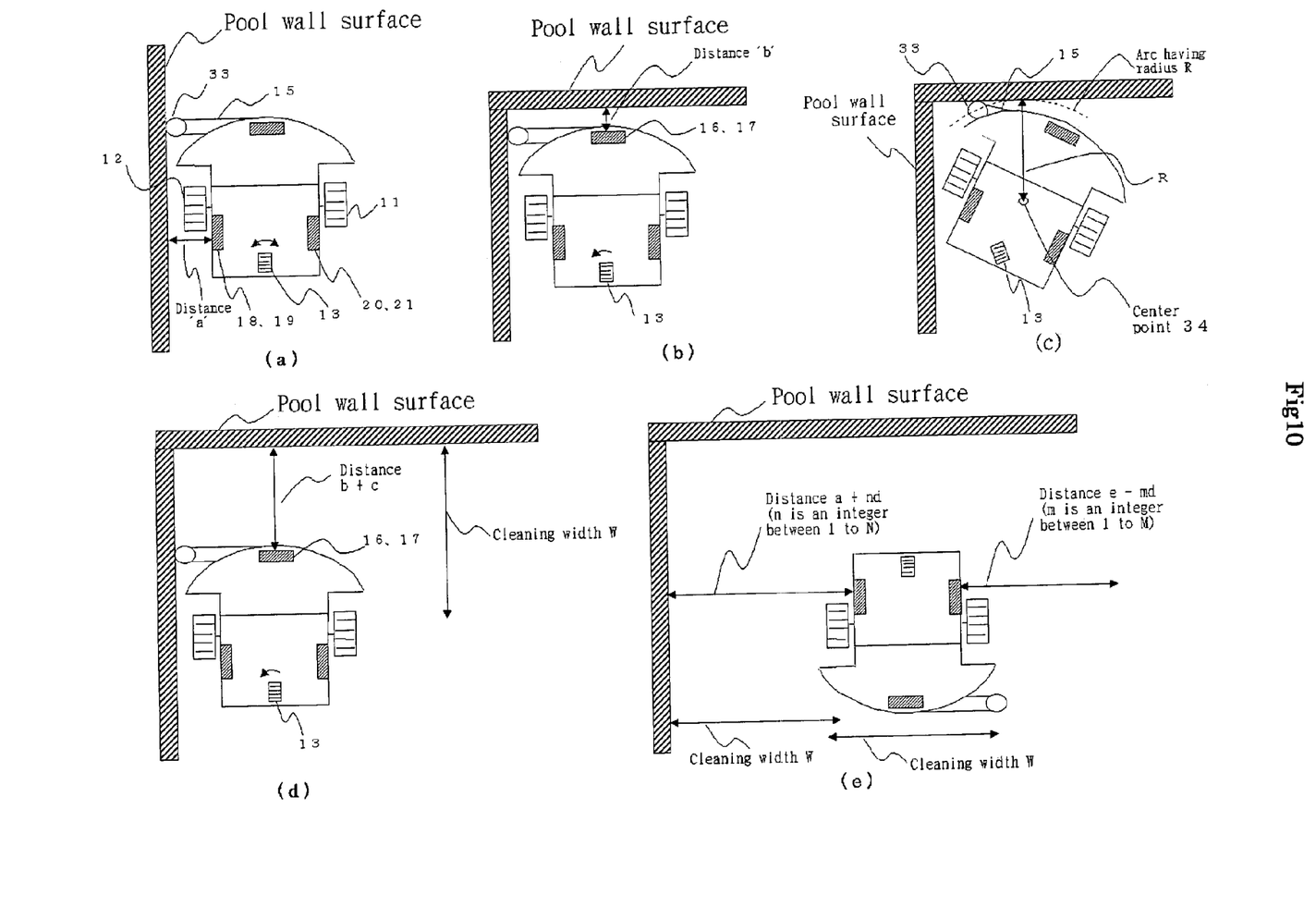

While the self-running cleaning apparatus moves along the wall, maintaining left-distance 'a', it uses the first front distance sensor 16 and section front distance sensor 17 to detect when the distance to the wall surface of the pool in the front reaches a front distance 'b' (Step 4), and when the distance from the surface of the pool in the front reaches the front distance 'b', the cleaning apparatus performs the 90-degree right turn operation (Step 5). When the cleaning apparatus reaches the front distance 'b' from the surface of the pool in the front as shown in FIG. 10(*b*), the movement-control unit 50 stops the right motor 51 and operates only the left motor 53 and shifts the displacement motor 55 in the left direction to turn the self-running cleaning apparatus 90 degrees to the right. The front distance 'b' is set at a distance where the obstacle-detection arm 24 does not come in contact with the wall surface of the pool, and by setting it to as short a distance as possible in the range where the obstacle-detection arm 24 does not come in contact with the wall surface of the pool, it is possible to clean in the corners of the pool.

As shown in FIG. 10(*c*), in the 90-degree turning operation the guide roller 33 of the rotating inlet 15 is pressed by the wall surface of the pool and the rotating inlet 15 rotates backward. In the 90-degree right turn operation, by taking the minimum distance from the center point 34 to the front wall surface of the pool (closest distance to the wall surface of the pool within the estimated rotation operation) to be R, the range of rotation is set such that by rotating the rotating shaft 27 it is possible to locate the entire rotating inlet 15, including the guide roller 33, inside an arc with radius R that is centered at center point 34, and therefore the 90-degree right turn operation is not hindered.

Figure 8:
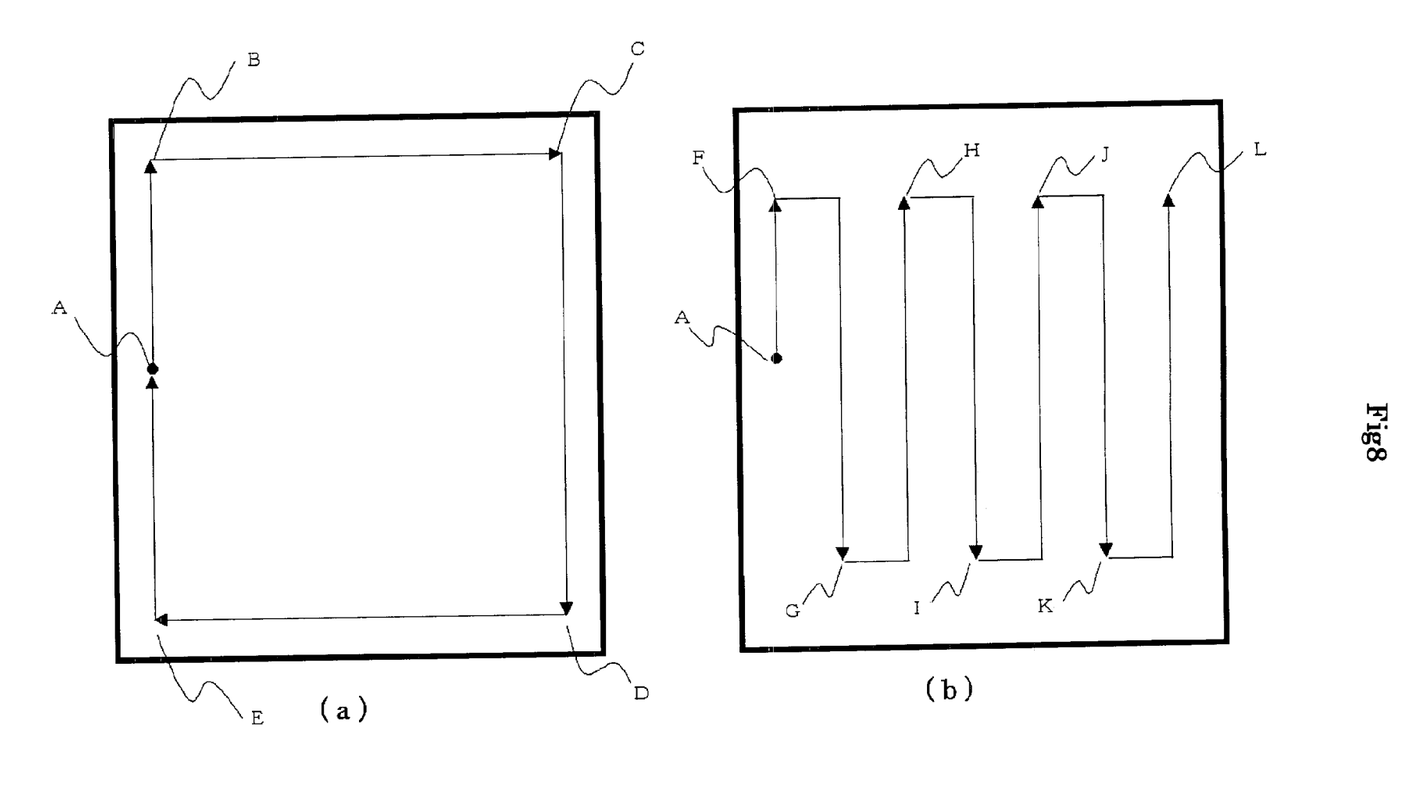

After the 90-degree right turn operation is finished, the movement-control unit 50 determines whether or not it was the fourth time that the 90-degree right turn operation of Step 5 was performed (Step 6), and when then number of times the 90-degree right turn operation has been performed is less than four times, it returns again to Step 1 and to the operation of moving along the wall at a left-side distance 'a'. As shown in FIG. 8(*a*), operation starts at point A and the operation of moving along the wall surface at left-side distance 'a' is performed up to point B. At point B, the first 90-degree right turn operation is performed, and the operation of moving along the wall surface at left-side distance 'a' is performed up to point C. At point C, the second 90-degree right turn operation is performed, and the operation of moving along the wall surface at left-side distance 'a' is performed up to point D. At point D, the third 90-degree right turn operation is performed, and the operation of moving along the wall surface at left-side distance 'a' is performed up to point E. At point E the fourth 90-degree right turn operation is performed.

After the fourth 90-degree right turn operation is performed at point E, the operation of moving along the wall surface is performed while maintaining the left-side distance 'a' (Step 7), and using the first front distance sensor 16 and second front distance sensor 17, the movement-control unit 50 detects whether or not the distance from the front wall surface of the pool has reached the front distance 'b+c' (Step 8). When the distance to the front wall surface of the pool has reached front distance 'b+c', the 180-degree right turn operation is performed (Step 9). As shown in FIG. 10(*d*), when the distance to the front wall surface of the pool has reached front distance 'b+c', the movement-control unit 50 stops the right motor 51, and operates only the left motor 53 and shifts the displacement motor 55 to the left and turns the self-running cleaning apparatus 180 degree to the right so that it is facing in the opposite direction, as shown in FIG. 10(*e*). The front distance 'b+c' is set to a distance that is shorter than the cleaning width W, which is the width that can be cleaned in one operation (width of the fixed inlet 14 and rotating inlet 15).

After performing the 180-degree right turn operation, the movement-control unit 50 compares the right-side distance to the wall surface of the pool on the right side with the left-side distance to the wall surface of the pool on the left side (Step 10), and when the right-side distance is shorter than the left-side distance, or in other words, when the distance to the wall surface of the pool, which was used as a reference in the operation of moving along the wall up until this point, is shorter than the distance to the other wall surface of the pool, it adds '1' to the initial value 'n', which was '0' (Step 11), and performs the operation of moving along the wall surface while maintaining a right-side distance 'a+nd' (or a+d since n=1) to the wall surface of the pool on the right side that was the reference of the operation of moving along the wall surface up until this point (Step 12). The distance 'd' is set shorter than the cleaning width W such that the cleaning width W that was cleaned in the operation along the wall before the 180-degree right turn operation overlaps with the cleaning width W that is cleaned in the operation along the wall after the 180-degree right turn operation.

After performing the 180-degree right turn operation, the movement-control unit 50 moves the cleaning apparatus along the wall surface while maintaining the right distance 'a+nd' (Step 12), and using the first front distance sensor 16 and second front distance sensor 17 detects whether or not the distance to the wall surface of the pool in the front has reached the front distance 'b+c' (Step 13), and when the distance to the wall surface of the pool in the front has reached front distance 'b+c', it performs the 180-degree left turn operation (Step 14). Here, the movement-control unit 50 stops the left motor 53 and operates only the right motor 51, then shifts the displacement motor 55 to the right and turns the self-cleaning apparatus 180 degrees to the left.

After performing the 180-degree left turn operation, the movement-control unit 50 compares the right-side distance to the wall surface of the pool on the right side with the left-side distance to the wall surface of the pool on the left side (Step 15), and when the left-side distance is shorter than the right side distance, or in other words, when the distance to the wall surface of the pool, which was used as a reference in the operation of moving along the wall up until this point, is shorter than the distance to the other wall surface of the pool, it adds '1' to the initial value 'n' (Step 16), and performs the operation of moving along the wall surface while maintaining a right-side distance 'a+nd' (or a+2d since n=2) to the wall surface of the pool on the right side that was the reference of the operation of moving along the wall surface up until this point (Step 17). By using the first front distance sensor 16 and second front distance sensor 17, the movement-control unit 50 detects whether or not the distance to the wall surface of the pool in the front has reached the front distance 'b+c' (Step 18), and when the distance to the wall surface of the pool in the front has reached the front distance 'b+c', it returns to Step 9.

In Step 10, when the left-side distance is shorter than the right-side distance, or in other words, when the distance to the other wall surface of the pool becomes shorter than the distance to the wall surface of the pool, which was used as a reference in the operation of moving along the wall up until this point, the movement-control unit 50 sets the left-side distance 'e' that was detected using the first left-side distance sensor 18 and second left-side distance sensor 19 (Step 19), and performs the operation of moving along the wall surface while maintaining the left-side distance 'e−md' (or left-side distance 'e' since the initial value of 'm' is '0') (Step 20).

Moreover, in Step 15, when the right-side distance is shorter than the left-side distance, or in other words, when the distance to the other wall surface of the pool becomes shorter than the distance to the wall surface of the pool, which was used as a reference in the operation of moving along the wall up until this point, the movement-control unit 50 sets the right-side distance 'e' that was detected by the first right-side distance sensor 20 and second right-side sensor 21 (Step 25), and performs the operation of moving along the wall surface while maintaining the left-side distance 'e−md' (or left-side distance 'e' since the initial value of 'm' is '0') (Step 26).

During the operation of moving along the wall in Step 20 and the operation of moving along the wall in Step 26, the movement-control unit 50 uses the first front distance sensor 16 and second front distance sensor 17 to detect whether or not the distance to the wall surface of the pool in the front has reached the front distance 'b+c' (Steps 21 and 27), and when the distance to the wall surface of the pool in the front has reached the front distance 'b+c', it adds '1' to 'm' (Steps 22, 28) and determines whether or not the distance 'e−md' is shorter than 'd', (Steps 23 and 29).

In Step 23, when the movement-control unit 50 determines that 'e−md' is longer than 'd', it goes to Step 26, and in Step 29, when it determines that 'e−md' is longer than 'd', it performs the 180-degree right turn operation (Step 30) and then goes to Step 20, and in Step 23 and Step 29, when it determines that 'e−md', is shorter than 'd', it ends processing.

As shown in FIG. 8(*b*), by performing the process from Step 9 to Step 30, the movement-control unit 50 turns the cleaning apparatus 180 degrees to the right at point F and performs the operation of moving along the wall surface up to point G, at point G it turns the cleaning apparatus 180 degrees to the left and performs the operation of moving along the wall surface up to point H, at point H it turns the cleaning apparatus 180 degrees to the right and performs the operation of moving along the wall surface up to point I, at point I it turns the cleaning apparatus 180 degrees to the left and performs the operation of moving along the wall surface up to point J, at point J it turns the cleaning apparatus 180 degrees to the right and performs the operation of moving along the wall surface up to point K, at point J it turns the cleaning apparatus 180 degrees to the left and performs the operation of moving along the wall surface up to point L, and at point L it ends processing and thus is able to evenly clean the entire bottom surface of the pool.

In order for the ultrasonic sensors that are used as the distance sensors 16 to 21 in this embodiment to accurately detect distance in water, the directivity width must be narrow, and if the ultrasonic waves do not perpendicularly hit the wall surface of the pool, the reflected waves cannot be received and there is a possibility that the distance cannot be detected, so in this embodiment, two ultrasonic sensors are located on each the front side, right side and left side of the main unit 10, and both or at least one of the ultrasonic sensors detects the distance. Furthermore, in the operation of moving along the wall surface using the left-side distance as a reference, when the left-side distances detected by the two ultrasonic sensors located on the left side, or in other words, the first left-side distance detector 18 and second left-side distance detector 19, are different, the main unit 10 is not parallel with the wall, so in order to make the main unit 10 parallel with the wall surface of the pool on the left side, the movement-control unit 50 drives the right motor 51, left motor 53 and displacement motor 55. Also, in the operation of moving along the wall surface using the right-side distance as a reference, when the right-side distances detected by the two ultrasonic sensors located on the left side, or in other words, the first right-side distance detector 20 and second right-side distance detector 21, are different, the movement-control unit 50 drives the right motor 51, left motor 53 and displacement motor 55 in order to make the main unit 10 parallel with the wall surface of the pool on the right side.

Moreover, the movement-control unit 50 stores the distances from the wall surface of the pool that were detected using the first front distance sensor 16, second front distance sensor 17, first left-side distance sensor 18, second left-side distance sensor 19, first right-side distance sensor 20 and second right-side distance sensor 21 (distances detected just previously) in memory, and when the it loses the wall surface that is used as a reference due to slippage of the wheels or the like during operation, it performs a position search operation and searches for the location that corresponds to the previously detected distances that are stored in memory and moves to that position. The position-search operation is an operation such as turning or meandering that changes the detection direction of each of the distance sensors 16 to 21.

As shown in FIG. 8(*a*), in this embodiment, after the outer parameter of the pool is cleaned, the cleaning apparatus moves in a zigzag pattern over the inner area of the pool, such that the entire bottom surface of the pool is cleaned, however, this procedure of movement is just an example of an efficient method of cleaning, and it is evident that this movement procedure and movement method can be suitably changed within the technical range of the invention.

As explained above, in this embodiment, by using the distance sensor located on the front and sides, the cleaning apparatus can move with the wall surface of the pool as a reference, so it can efficiently move over the entire bottom surface of the pool and effectively clean the entire bottom surface of the pool within a short period of time.

Furthermore, with this embodiment, when an obstacle is detected in front by the obstacle-detection arm and obstacle-detection sensor, the movement-control unit performs a detour operation so cleaning is not interrupted because of the obstacle in the front, and thus it is possible to efficiently clean the entire bottom surface of the pool in a short period of time.

Also, with this embodiment, when the wall surface used as a reference cannot be found, the movement-control unit performs a position-search operation and searches for and moves to the position corresponding to the distance detected just previously, so there is no need to interrupt the cleaning operation and thus it is possible to efficiently clean the entire bottom surface of the pool in a short period of time.

The invention is not limited to the embodiment described above, and it is evident that the embodiment can be suitably changed within the technical range of the invention. Also, the number, location and shape of the components are limited to those of the embodiment described above, and can be suitably changed. In the figures, the same reference numbers are used for identical components.

The self-cleaning apparatus and self-cleaning method of this invention uses distance sensors located on the front and sides in order to move with reference to the wall surface of a pool so it is possible to efficiently move over the entire bottom surface of the pool and to clean the entire bottom surface of the pool in a short period of time.

Moreover, the self-cleaning apparatus and self-cleaning method of this invention uses an obstacle-detection arm 24 and obstacle-detection sensor 25 to detect obstacles in front, and performs a detour operation when an obstacle is detected, so cleaning is not interrupted due to an obstacle in the front, and thus it is possible to efficiently clean the entire bottom surface of the pool in short period of time.

Furthermore, the self-cleaning apparatus and self-cleaning method of this invention performs a position-detection operation when the reference wall surface cannot be found and searches for and moves to the position corresponding to the distance detected just previously, so cleaning is not interrupted and it is possible to efficiently clean the entire bottom surface of the pool in a short period of time.

EXPLANATION OF REFERENCE NUMBERS

10 Main unit
11 Right wheel
12 Left wheel
13 Direction wheel
14 Fixed inlet
15 Rotating inlet
16 First front distance sensor
17 Second front distance sensor
18 First left-side distance sensor
19 Second left-side distance sensor
20 First right-side distance sensor
21 Second right-side distance sensor
22 I bolt
23 Handle
24 Obstacle-detection arm
25 Obstacle-detection sensor
26 Installation chassis
27 Rotating shaft
28 Bearing
29 C-ring
30 Fixed stud
31 Rotating-side stud
32 Torsion spring
33 Guide roller
50 Movement-control unit
51 Right motor
52 Right encoder
53 Left motor
54 Left encoder
55 Displacement motor
56 Displacement encoder
57 Movement-memory unit

DRAWINGS

FIG. 6
First front distance sensor 16
Second front distance sensor 17
First left-side distance sensor 18
Second left-side distance sensor 19
First right-side distance sensor 20
Second right-side distance sensor 21
Obstacle-detection sensor 25
Movement-control unit 50
Right motor 51
Right encoder 52
Left motor 53
Left encoder 54
Displacement motor 55
Displacement encoder 56
Operation-memory unit 57
Wall-movement operation
Detour-movement operation
90-degree right turn operation
180-degree right turn operation
180-degree left turn operation
Position-detection operation FIG. 7
Find position on wall surface of the pool.
Move along wall surface at left-side distance 'a'. S1
Are there obstacles? S2
Detour-movement operation S3
Is the front distance=b? S4
90-degree right turn operation S5
Is it the fourth 90-degree right turn? S6
Move along wall surface at left-side distance 'a'. S7
Is the front distance=b+c? S8
180-degree right turn operation S9
Is the right-side distance<left-side distance? S10
Move along wall surface at right-side distance a+nd. S12
Is the front distance=b+c? S13
180-degree left turn operation S14
Is the left-side distance<right-side distance? S15
Move along wall surface at left-side distance a+nd. S17
Is the front distance=b+c? S18
Set left-side distance 'e'. S19
Move along wall surface at left-side distance 'e−md'. S20
Is the front distance=b+c? S21
180-degree left turn operation S24
Set left-side distance 'e'. S25
Move along wall surface at right-side distance 'e−md'. S26
Is the front distance=b+c? S27
180-degree right turn operation S30

FIG. 9(a)
Pool wall surface
Obstacle
Obstacle-detection arm

FIG. 9(b)
Pool wall surface
Obstacle

FIG. 10(a)
Pool wall surface
Distance 'a'

FIG. 10(b)
Pool wall surface
Distance 'b'

FIG. 10(c)
Pool wall surface
Arc having radius R
Center point 34

FIG. 10(d)
Pool wall surface
Distance b+c
Cleaning width W

FIG. 10(e)
Pool wall surface

Distance a+nd (n is an integer between 1 to N)
Distance e−md (m is an integer between 1 to M)
Cleaning width W
Cleaning width W

What is claimed is:

1. A self-running cleaning apparatus that cleans while moving along a wall surface comprising:
   a main unit, the main unit having a front, a back, sides, a top, and a bottom;
   wheels for moving the main unit, the wheels connected to the sides of the main unit, the wheels having an axis;
   a rotating inlet attached to the bottom of the main unit for sucking matter from a bottom surface, the rotating inlet having a front end and a free end, wherein the front end of the rotating inlet forms a straight line, wherein the free end of the rotating inlet projects beyond the side of the main unit;
   suction-inlet-installation means for installing the rotating inlet to the main unit so that the rotating inlet can rotate;
   tension means for applying tension to of said rotating inlet such that the front end of said rotating inlet is parallel with the axis of the wheels when no external force is applied;
   wherein the rotating inlet is positioned at the front of the main unit when no external force is applied;
   a rotation-control means for rotating the main unit's direction of movement by 90 degrees when the distance from the front of the main unit to said wall surface in the front becomes a specified pre-determined distance; and
   wherein said rotating inlet is pressed and rotated by said wall surface in the front during the rotating operation by said rotation-control means.

2. The self-running cleaning apparatus of claim 1 wherein when a shortest distance between a center of rotation during the rotating operation by said rotation-control means and said wall surface is R, the rotation of said rotating inlet can be located within an arc having radius R around whose center the free end of said rotating inlet rotates.

3. The self-running cleaning apparatus of claim 1 wherein a rotatable guide roller is attached to the free end of said rotating inlet.

4. The self-running cleaning apparatus of claim 1 wherein said rotating inlet comprises a rotating shaft, and said suction-inlet-installation means comprises a bearing that supports said rotating shaft from the outside of said main unit such that it can rotate, and wherein suction cleaning occurs through said rotating shaft.

* * * * *